United States Patent
Lee et al.

(10) Patent No.: US 11,959,668 B2
(45) Date of Patent: Apr. 16, 2024

(54) HEAT MANAGEMENT SYSTEM

(71) Applicant: Hanon Systems, Daejeon (KR)

(72) Inventors: Hae-Jun Lee, Daejeon (KR); Sung Je Lee, Daejeon (KR); In-Guk Hwang, Daejeon (KR)

(73) Assignee: Hanon Systems, Daejeon (KR)

( * ) Notice: Subject to any disclaimer, the term of this patent is extended or adjusted under 35 U.S.C. 154(b) by 478 days.

(21) Appl. No.: 17/286,064

(22) PCT Filed: Oct. 14, 2019

(86) PCT No.: PCT/KR2019/013406
§ 371 (c)(1),
(2) Date: Apr. 16, 2021

(87) PCT Pub. No.: WO2020/080760
PCT Pub. Date: Apr. 23, 2020

(65) Prior Publication Data
US 2021/0370747 A1 Dec. 2, 2021

(30) Foreign Application Priority Data

Oct. 19, 2018 (KR) ........................ 10-2018-0125271

(51) Int. Cl.
| | |
|---|---|
| *F25B 25/00* | (2006.01) |
| *B60H 1/00* | (2006.01) |
| *B60H 1/03* | (2006.01) |
| *B60H 1/14* | (2006.01) |
| *B60H 1/32* | (2006.01) |

(Continued)

(52) U.S. Cl.
CPC ....... *F25B 25/005* (2013.01); *B60H 1/00278* (2013.01); *B60H 1/00392* (2013.01);
(Continued)

(58) Field of Classification Search
CPC ...... F25B 41/20; F25B 41/24; F25B 2341/06; F25B 2400/0403; B60H 1/00278;
(Continued)

(56) References Cited

U.S. PATENT DOCUMENTS

2011/0296855 A1* 12/2011 Johnston ................. B60L 50/40
62/160
2013/0118707 A1* 5/2013 Kardos ............... H01M 10/615
165/42

(Continued)

FOREIGN PATENT DOCUMENTS

KR 10-2012-0014621 A 2/2012
KR 10-2012-0137100 A 12/2012

(Continued)

*Primary Examiner* — Miguel A Diaz
(74) *Attorney, Agent, or Firm* — Norton Rose Fulbright US LLP; James R. Crawford

(57) ABSTRACT

A heat management system which includes: a refrigerant circulation line which includes a compressor, a water cooling-type condenser, a first expansion valve, an air cooling-type condenser, a second expansion valve, and an evaporator, and cools the indoor space by circulating a refrigerant; a heating line which heats the indoor space by circulating cooling water which exchanges heat with the refrigerant through the water cooling-type condenser; a first cooling line which cools a battery by circulating cooling water which exchanges heat with air or the refrigerant; and a second cooling line which cools electric components including a driving motor, by circulating cooling water which exchanges heat with air or the refrigerant. The heat management system enables efficient heat management of electric components and a battery in a vehicle as well as cooling and heating of the vehicle.

23 Claims, 12 Drawing Sheets

(51) Int. Cl.
*F25B 41/20* (2021.01)
*F25B 41/24* (2021.01)
*F25B 41/39* (2021.01)

(52) U.S. Cl.
CPC ..... *B60H 1/00885* (2013.01); *B60H 1/00914* (2013.01); *B60H 1/034* (2013.01); *B60H 1/143* (2013.01); *B60H 1/323* (2013.01); *F25B 41/20* (2021.01); *F25B 41/24* (2021.01); *F25B 41/39* (2021.01); *B60H 2001/00949* (2013.01); *F25B 2341/06* (2013.01); *F25B 2400/0403* (2013.01)

(58) Field of Classification Search
CPC ............ B60H 1/00392; B60H 1/00885; B60H 1/00914; B60H 1/034; B60H 1/143; B60H 1/323; B60H 2001/00949
See application file for complete search history.

(56) References Cited

U.S. PATENT DOCUMENTS

| | | |
|---|---|---|
| 2016/0107504 A1 | 4/2016 | Johnston |
| 2016/0107508 A1 | 4/2016 | Johnston |
| 2017/0021698 A1 | 1/2017 | Hatakeyama et al. |
| 2018/0117990 A1* | 5/2018 | Kim .................. B60H 1/32284 |

FOREIGN PATENT DOCUMENTS

| | | |
|---|---|---|
| KR | 10-2014-0147365 A | 12/2014 |
| KR | 20150041739 A | 4/2015 |
| KR | 20170067502 A | 6/2017 |
| KR | 10-2017-0108447 A | 9/2017 |
| KR | 20170139204 A | 12/2017 |
| KR | 101846923 B1 | 4/2018 |

* cited by examiner

HEAT MANAGEMENT SYSTEM

This application is a national phase under 35 U.S.C. § 371 of International Application No. PCT/KR2019/013406 filed Oct. 14, 2019, which claims the benefit of priority from Korean Patent Application No. 10-2018-0125271 filed on Oct. 19, 2018. The entire contents of these applications are incorporated herein by reference in their entirety.

TECHNICAL FIELD

The present invention relates to a heat management system, and in particular, to a system for managing heat of electric components and batteries in a vehicle as well as cooling and heating of the vehicle.

BACKGROUND ART

Recently, electric vehicles have been spotlighted as implementation of environmentally friendly technologies and solutions to problems such as energy depletion in an automotive field.

Electric vehicles are driven using a motor actuated upon receiving power from a battery or a fuel cell, so that carbon emission and noise are low. In addition, electric vehicles are eco-friendly as they use motors that are more energy efficient than existing engines.

However, since electric vehicles generate a lot of heat when a battery and a driving motor are operated, heat management is important. In addition, since it takes a long time to recharge the battery, it is important to efficiently manage a usage time of the battery. In particular, since a refrigerant compressor of electric vehicles driven for indoor air-conditioning is also driven by electricity, it is more important to manage the usage time of the battery. In addition, since a drive motor and an inverter generate relatively more heat than other electric components such as batteries or chargers, the drive motor must be cooled to an appropriate temperature, and to this end, there is a need to increase cooling performance of a heat exchanger for cooling the drive motor.

RELATED ART DOCUMENT

Patent Document

KR 2014-0147365 A (2014.12.30).

DISCLOSURE

Technical Problem

An object of the present invention is to provide a heat management system capable of efficiently managing heat of electric components and batteries in a vehicle as well as cooling and heating of the vehicle.

Another object of the present invention is to provide a heat management system capable of improving cooling performance of a drive motor in the case of a vehicle to which a high capacity drive motor is applied, and capable of utilizing waste of an electric component.

Technical Solution

In one general aspect, a heat management system includes: a refrigerant circulation line 200 including a compressor 210, a water-cooled condenser 220, a first expansion valve 225, an air-cooled condenser 230, a second expansion valve 240, an evaporator 242, a refrigerant heat exchanger 233 heat-exchanging a refrigerant flowing into the second expansion valve 240 and a refrigerant discharged from the evaporator 242 with each other, and a first refrigerant bypass line 232 allowing the refrigerant passing through the water-cooled condenser 220 to bypass the first expansion valve 225 and the air-cooled condenser 230, and circulating the refrigerant to cool an indoor area; a heating line 301 heating the indoor area by circulating a coolant heat-exchanged with the refrigerant through the water-cooled condenser 220; a first cooling line 302 cooling a battery 350 by circulating a coolant heat-exchanged with air or the refrigerant; and a second cooling line 303 cooling an electric component 460 including a drive motor by circulating a coolant heat-exchanged with air or the refrigerant.

The first cooling line 302 may include a first connection line 302-1 branched from one side of the first cooling line 302 and connected to the heating line 301; and a second connection line 302-2 branched from the other side of the first cooling line 302 and connected to the heating line 301.

The first connection line 302-1, the second connection line 302-2, and the heating line 301 may be connected to a first directional valve 410, and the first cooling line 302 and the heating line 301 may be connected to each other or blocked in connection by the first directional valve 410.

The second cooling line 303 may include a fourth connection line 302-4 branched from one side of the second cooling line 303 and connected to the first cooling line 302; and a fifth connection line 302-5 branched from the other side of the second cooling line 303 and connected to the first cooling line 302.

The second cooling line 303 and the fourth connection line 302-4 may be connected by a fourth directional valve 331, the second cooling line 303 and the fifth connection line 302-5 may be connected by a fifth directional valve 332, and the first cooling line 302 and the second cooling line 303 may be connected to each other or blocked in connection by the fourth directional valve 331 and the fifth directional valve 332.

The water-cooled condenser 220 may be connected only to the heating line 301.

The refrigerant circulation line 200 may further include a third expansion valve 251 throttling or bypassing a refrigerant discharged from the water-cooled condenser 220 or blocking a flow of the refrigerant; and a chiller 252 heat-exchanging a refrigerant discharged from the third expansion valve 251 with coolant of the first cooling line 302.

The first cooling line 302 may include a third connection line 302-3 connected in parallel with the battery 350 and passing through the chiller 252, and the third connection line 302-3 may be connected to the first cooling line 302 by the third directional valve 330 so that a coolant may flow in the third connection line 302-3 or a flow of the coolant may be blocked by the third directional valve 330.

The first cooling line 302 may include a first radiator 310 for cooling the coolant with air.

The drive motor of the electric component 460 may include a front wheel drive motor and a rear wheel drive motor, and any one of a first electric component 460-1 including the front wheel drive motor and a second electric component 460-2 including the rear wheel drive motor may be disposed on the first cooling line 302 and the other may be disposed on the second cooling line 303.

The first cooling line 302 may include: a first connection line 302-1 branched from one side of the first cooling line 302 and connected to the heating line 301; and a second connection line 302-2 branched from the other side of the first cooling line 302 and connected to the heating line 301, and the first electric component 460-1 or the second electric component 460-2 may be disposed on the second connection line 302-2.

The second cooling line 303 may include a second radiator 380 for cooling a coolant with air.

The second cooling line 303 may further include a fourth coolant pump 334 for circulating a coolant.

The first cooling line 302 and the second cooling line 303 may include reservoir tanks 371 and 372 for storing a coolant, respectively.

The first cooling line 302 and the second cooling line 303 may include an integral reservoir tank 370 for storing a coolant, and an internal space of the reservoir tank 370 may be partitioned by a partition so that a coolant flowing along the first cooling line 302 and a coolant flowing along the second cooling line 303 may not be mixed with each other in the reservoir tank 370.

The heating line 301 may include a heater core 440 heating an indoor area using air heated by heat-exchanging the coolant heat-exchanged with a refrigerant through the water-cooled condenser 220 and air introduced to the indoor area; and a coolant heater 430 disposed in front of the heater core 440 in a flow direction of the coolant to heat the coolant.

The heating line 301 may include a heater core 440 heating the indoor area using heated air by heat-exchanging a coolant heat-exchanged with a refrigerant through the water-cooled condenser 220 and air introduced to the indoor area, and the heat management system may further include: the air heating type heater 470 configured separately from the heating line 301 and heating an indoor area by directly heating air introduced to the indoor area.

In a mild cooling mode, the third expansion valve 251 may be closed so that a refrigerant may not pass through the chiller 252.

In a battery only cooling mode, the second expansion valve 240 may be closed and a refrigerant may not pass through the evaporator 242.

In a battery temperature rising mode, a refrigerant may not be circulated in the refrigerant circulation line 200.

In a battery temperature rising mode, a coolant may not be circulated in the second cooling line 303.

In the mild heating mode, a refrigerant may not be circulated in the refrigerant circulation line 200.

In a dehumidification heating mode, a refrigerant may not flow to the air-cooled condenser 230 and a refrigerant may flow to the first refrigerant bypass line 232.

Advantageous Effects

The heat management system of the present invention enables efficient heat management of electric components and batteries in a vehicle as well as cooling and heating of the vehicle.

In addition, in the case of a vehicle to which a high performance or high capacity drive motor is applied, cooling performance of the drive motor may be improved and waste heat of an electric component may be utilized.

BEST MODE

Hereinafter, a heat management system of the present invention having the configuration as described above will be described in detail with reference to the accompanying drawings.

Figure 1:
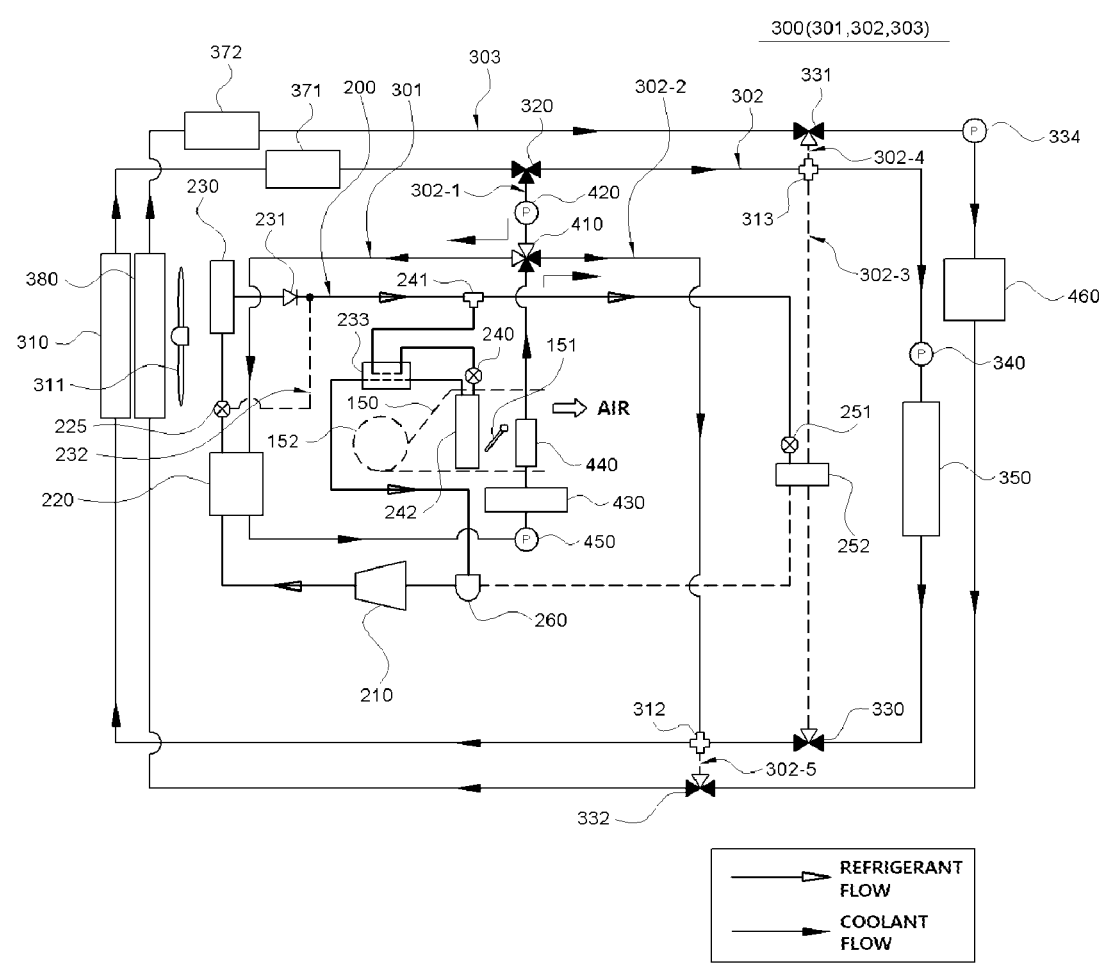
FIG. 1 is a block diagram showing a heat management system according to an exemplary embodiment of the present invention.

FIG. 1 is a configuration diagram showing a heat management system according to an exemplary embodiment of the present invention.

Referring to FIG. 1, a heat management system of the present invention may include a refrigerant circulation line 200 in which a refrigerant circulates to cool an indoor area and a coolant circulation line 300 in which a coolant circulates to heat the indoor area and cool components. In addition, the coolant circulation line 300 may include a heating line 301 for indoor heating, a first cooling line 302 for cooling a battery 350, and a second cooling line 303 for cooling an electric component 460.

The refrigerant circulation line 200 may include a compressor 210, a water-cooled condenser 220, a first expansion valve 225, an air-cooled condenser 230, a check valve 231, a first refrigerant bypass line 232, a refrigerant branch part 241, a second expansion valve 240, an evaporator 242, a refrigerant heat exchanger 233, an accumulator 260, a third expansion valve 251, and a chiller 252.

The compressor 210 may be an electric compressor driven upon receiving power, and serves to suck and compress a refrigerant and discharge the refrigerant toward the water-cooled condenser 220.

The water-cooled condenser 220 serves to heat-exchange the refrigerant discharged from the compressor 210 with a coolant to condense it into a liquid refrigerant, and send the condensed refrigerant to the first expansion valve 225.

The first expansion valve 225 may throttle or bypass the refrigerant or block a flow of the refrigerant, and may be disposed behind the water-cooled condenser 220 in the flow direction of the refrigerant.

The air-cooled condenser 230 may serve as a condenser or an evaporator, and a function of the air-cooled condenser 230 may be varied according to the role of the first expansion valve 225. That is, when the refrigerant circulation line 200 is used as an air conditioner loop, the first expansion valve 225 may be completely opened to allow the refrigerant to pass therethrough and the air-cooled condenser 230 acts as a condenser together with the water-cooled condenser 220, and when the refrigerant circulation line 200 is used as a heat pump loop, the first expansion valve 225 may throttle the refrigerant and the air-cooled condenser 230 may serve as an evaporator. In addition, the air-cooled condenser 230 may be cooled or heated by external air in an air-cooling manner.

The check valve 231 may serve to prevent the refrigerant from flowing backward, and may be installed at the rear of the air-cooled condenser 230 in the flow direction of the refrigerant to prevent the refrigerant from flowing into a discharge side of the air-cooled condenser 230.

The first refrigerant bypass line 232 is connected in parallel with the air-cooled condenser 230, the first refrigerant bypass line 232 has one end connected to the first expansion valve 225 and the other end connected to the rear of the check valve 231 in the refrigerant flow direction so that the refrigerant discharged from the water-cooled condenser 220 may selectively pass through the air-cooled condenser 230 or the first refrigerant bypass line 232. That is, the first refrigerant bypass line 232 may allow the refrigerant that has passed through the water-cooled condenser 220 to bypass the first expansion valve 225 and the air-cooled condenser 230. Here, the refrigerant may flow only toward the air-cooled condenser 230 by the operation of the first expansion valve 225 and may not flow to the first refrigerant bypass line 232. Here, the refrigerant flowing toward the air-cooled condenser 230 may be throttled by the first expansion valve 225 or may pass through the first expansion valve 225 without being throttled. Alternatively, the refrigerant may not flow toward the air-cooled condenser 230 by the operation of the first expansion valve 225 and may flow only to the first refrigerant bypass line 232, and here, the refrigerant flowing toward the first refrigerant bypass line 232 may be a refrigerant bypassed from the first expansion valve 225.

The refrigerant branch part 241 may be formed at a rear side of a point where the rear side of the air-cooled condenser 230 and the first refrigerant bypass line 232 meet in the flow direction of the refrigerant. Two lines may be branched from the refrigerant branch part 241, and one branched line may be connected to the evaporator 242 and the other may be connected to the chiller 252.

The second expansion valve 240 and the third expansion valve 251 may serve to throttle, allow the refrigerant to pass therethrough, or block a flow of the refrigerant. In addition, the second expansion valve 240 and the third expansion valve 251 may be configured in parallel. That is, two refrigerant lines may be branched from the refrigerant branch part 241, the second expansion valve 240 may be disposed on one of the two branched refrigerant lines, and the third expansion valve 251 may be disposed on the other branched refrigerant line. In this case, the second expansion valve 240 may be disposed in front of the evaporator 242, and the third expansion valve 251 may be disposed in front of the chiller 252.

The evaporator 242 may be disposed at the rear of the second expansion valve 240 in the flow direction of the refrigerant and provided inside an air-conditioning device 150 of a vehicle so that air moved by a blower 152 of the air-conditioning device may be cooled through the evaporator 242 and supplied to the interior of a vehicle to be used for indoor cooling of the vehicle.

The refrigerant heat exchanger 233 serves to improve cooling performance by exchanging a refrigerant flowing into the second expansion valve 240 and a refrigerant discharged from the evaporator 242 with each other. Here, through the refrigerant heat exchanger 233, an inlet side refrigerant line, in which the refrigerant flows into the evaporator 242 connecting the refrigerant branch part 241 and the second expansion valve 240, passes and a discharge side refrigerant line, in which the refrigerant is discharged from the evaporator 242 connecting the evaporator 242 and the accumulator 260, passes, and the refrigerants passing through the inlet side refrigerant line and the discharge side refrigerant line may exchange heat with each other at the refrigerant heat exchanger 233. Accordingly, the refrigerant may be further cooled by the refrigerant heat exchanger 233, before flowing into the second expansion valve 240, so that cooling performance through the evaporator 242 may be improved and, at the same time, efficiency of the cooling system may be improved.

In particular, the refrigerant heat exchanger 233 is connected in parallel with the air-cooled condenser 230 and the chiller 252. That is, the refrigerant heat exchanger 233 is not disposed in series in the refrigerant line between the air-cooled condenser 230 and the chiller 252, but is disposed adjacent to the evaporator 242. If the refrigerant heat exchanger 233 is disposed in series between the air-cooled condenser 230 and the chiller 252, it may drop a pressure on the low pressure side in the heating mode to reduce heating performance. Conversely, when the refrigerant heat exchanger 233 is connected in parallel, cooling performance as well as heating performance may be increased because the refrigerant heat exchanger 233 is not present between the condensers 220 and 230 and the chiller 252 in terms of a refrigerant flow in the heating mode.

The chiller 252 may be disposed at the rear of the third expansion valve 251 in the flow direction of the refrigerant and heat-exchanged with a coolant to cool the coolant. Accordingly, the second expansion valve 240 and the evaporator 242 form a set, and the third expansion valve 251 and the chiller 252 form another set, and the two sets are formed in parallel on the refrigerant line. In addition, a refrigerant line may join at a rear side of the evaporator 242 and the chiller 252 in the refrigerant flow direction to form one refrigerant line.

In addition, the accumulator 260 may separate a liquid refrigerant from a gaseous refrigerant from the refrigerant and supply only the gaseous refrigerant to the compressor 210. Here, the accumulator 260 is arranged and connected at the point where the rear side of the evaporator 242 and the refrigerant line on the rear side of the chiller 252 join, and the accumulator 260 may be disposed at the front of the compressor 210 in the refrigerant flow direction.

The heating line 301 may include the water-cooled condenser 220, a first coolant pump 450, a coolant heater 430, a heater core 440, and a first directional valve 410.

The water-cooled condenser 220 may allow the refrigerant and the coolant flowing along the heating line 301 to exchange heat with each other, while passing therethrough.

The first coolant pump 450 is a means for pumping a coolant so that the coolant is circulated along the heating line 301. The first coolant pump 450 may be disposed at the rear of the water-cooled condenser 220 in the flow direction of the coolant and installed on the coolant line.

The coolant heater 430 is a device that heats the coolant, and may be connected to the rear of the first coolant pump 450 and to the front of the heater core 440 in the flow direction of the coolant. In addition, the coolant heater 430 may be operated when a temperature of the coolant is equal to or lower than a specific temperature, and may be variously formed, such as an induction heater, a sheath heater, a positive temperature coefficient (PTC) heater, and a film heater that may generate heat using power.

The heater core 440 may be disposed in the air-conditioning device 150 of the vehicle, and air blown by the blower 152 may be heated through the heater core 440, supplied to the interior of the vehicle and used for indoor heating. In addition, the heater core 440 may be disposed at the rear of and connected to the coolant heater 430 in the flow direction of the coolant.

The first directional valve 410 may be installed between the heater core 440 and the water-cooled condenser 220, and may be configured to selectively connect the heating line 301 and the first cooling line 302 to be described later or may cut off connection. In more detail, the first directional valve 410 may be installed on the heating line 301 so that two coolant line pipes may be connected to the first directional valve 410, one first connection line 302-1 branched from one side of the cooling line 302 may be connected to the first directional valve 410, and one second connection line 302-2 branched from the other side of the first cooling line 302 may be connected to the first directional valve 410. That is, four coolant lines are connected to meet at the first directional valve 410, and the first directional valve 410 may be a four-way directional valve for controlling a state in which the four coolant lines are connected or blocked.

The first cooling line 302 may include a first radiator 310, a reservoir tank 371, a second directional valve 320, a second coolant pump 420, a first directional valve 410, a first coolant joint 313, a second coolant joint 312, a third coolant pump 340, a battery 350, a chiller 252, and a third directional valve 330.

The first radiator 310 may be a radiator that cools the coolant heat-exchanged with the battery 350, and the first radiator 310 may be cooled by air cooling by a cooling fan 311.

The reservoir tank 371 may serve to store a coolant and supplement coolant if there is insufficient coolant on the coolant line. The reservoir tank 371 may be installed on the coolant line in front of the second coolant pump 420 and the third coolant pump 340 in the flow direction of the coolant.

The second directional valve 320 may be installed on the first cooling line 302 so that two coolant pipes may be connected to the second directional valve 320, and the first directional valve 410 and the second directional valve 320 may be connected to the first connection line 302-1 so that the heating line 301 and the first cooling line 302 are connected. That is, the second directional valve 320 is connected to meet the three coolant lines, and the second directional valve 320 may be a 3-way directional valve to control a state in which the three coolant lines are connected to each other or cut off in connection.

The second coolant pump 420 is a means for pumping the coolant so that the coolant is circulated along the first cooling line 302. The second coolant pump 420 may be installed on the first connection line 302-1 between the first directional valve 410 and the second directional valve 320 so that a coolant may flow from the second directional valve 320 to the first directional valve 410 by the operation of the second coolant pump 420.

The first directional valve 410 is the same as described in the heating line 301.

The third coolant pump 340 is a means for pumping the coolant so that the coolant is circulated along the first cooling line 302. In addition, the third coolant pump 340 may be installed at a coolant line between the first coolant joint 313 and the battery 350, so that a coolant may flow from the third coolant pump 340 to the battery 350.

The battery 350 is a power source of the vehicle, and may be a driving source of various electric components 460 in the vehicle. Alternatively, the battery 350 may be connected to a fuel cell to serve to store electricity or to store electricity supplied from the outside. In addition, the battery 350 may be disposed on the coolant line between the third coolant pump 340 and the third directional valve 330. Thus, the battery 350 may be heat-exchanged with the flowing coolant so as to be cooled or heated.

The first coolant joint 313 is installed on the coolant line at the rear of the second directional valve 320 in the flow direction of the coolant, and the first coolant joint 313 is connected to meet the four coolant lines. That is, the first coolant joint 313 is installed so that both sides are connected on the first cooling line 302, the third connection line 302-3 may be connected to a lower side, and a fourth connection line 302-4 may be connected to an upper side. Here, the third connection line 302-3 may be connected to pass through the chiller 252.

The second coolant joint 312 may be installed at a point where a rear end of the second connection line 302-2 meets the first cooling line 302, and connected so that four coolant lines meet at the second coolant joint 312. That is, the second coolant joint 312 is installed so that both sides are connected on the first cooling line 302, the second connection line 302-2 may be connected to an upper side, and a fifth connection line 302-5 may be connected to a lower side.

The chiller 252 is the same as described above in the heating line 301 described above.

The third directional valve 330 is installed on the coolant line between the battery 350 and the second coolant joint 312, two coolant pipes may be connected to the third directional valve 330, and the third connection line 302-3 may be connected to an upper side of the third directional valve 330 so that the battery 350 and the third connection line 302-3 may be connected in parallel. Here, the second directional valve 320 may be a three-way directional valve capable of controlling a state in which three coolant lines are connected to each other or cut off.

In addition, the second cooling line 303 may include a second radiator 380, a reservoir tank 372, a fourth directional valve 331, a fourth coolant pump 334, an electric component 460, a fifth directional valve 332, and a water-cooled condenser 220.

The second radiator 380 may be a radiator that cools a coolant heat-exchanged with the electric component 460, and the second radiator 380 may be cooled by the cooling fan 311 in an air cooling manner.

The reservoir tank 372 may store a coolant and supplement the coolant if the coolant is insufficient on the coolant line, and the reservoir tank 372 may be installed on the coolant line in front of the fourth coolant pump 334 in the flow direction of the coolant.

The fourth directional valve 331 may be installed on the second cooling line 303 so that two coolant pipes may be connected to the fourth directional valve 331, and the fourth directional valve 331 and the first coolant joint 313 may be connected to the fourth connection line 302-4 so that the first cooling line 302 and the second cooling line may be connected to each other. That is, the fourth directional valve 331 may be connected so that the three coolant lines meet, and the fourth directional valve 331 may be a three-way directional valve capable of controlling a state in which the three coolant lines are connected or blocked.

The fourth coolant pump 334 is a means for pumping the coolant so that the coolant is circulated along the second cooling line 303. In addition, the fourth coolant pump 334 may be installed on the coolant line between the fourth directional valve 331 and the electric component 460 so that the coolant may flow from the fourth directional valve 331 toward the electric component 460 by the operation of the fourth coolant pump 334.

The electric component 460 may be disposed behind the fourth coolant pump 334 in the flow direction of the coolant, and the electric component 460 may be cooled by the coolant. In addition, the electric component 460 may be a drive motor, an inverter, an on board charger (OBC), or the like, and the drive motor may include a front drive motor and a rear drive motor.

The fifth directional valve 332 may be installed on the second cooling line 303 so that two coolant pipes may be connected to the fifth directional valve 332, and the fifth directional valve 332 and the second coolant joint 312 may be connected to the fifth connection line 302-5 so that the first cooling line 302 and the second cooling line 303 may be connected. That is, the fifth directional valve 332 may be connected so that three coolant lines meet, and the fifth directional valve 332 may be a three-way directional valve that can control a state in which the three coolant lines are connected or blocked.

The water-cooled condenser 220 may allow the refrigerant and the coolant flowing along the second cooling line 303 to be heat-exchanged therethrough.

The air-conditioning device 150 may include a blower 152 installed on one side to blow air, and a temperature control door 151 may be installed inside the air-conditioning device 150. In addition, the evaporator 242 and the heater core 440 disposed in the air-conditioning device may be disposed and configured to allow air discharged from the blower 152 to flow into the indoor area after passing through only the evaporator 242 or to flow into the indoor area through the heater core 440 after passing through the evaporator 242 according to an operation of the temperature control door 151.

Thus, the heat management system of the present invention enables efficient heat management of electric components and batteries in the vehicle as well as cooling and heating of the vehicle. In addition, in the case of a vehicle to which a high-performance or high-capacity drive motor is applied, cooling performance of the drive motor may be improved by the second cooling line and waste heat of electric components may be utilized.

Hereinafter, an operation of the heat management system according to an exemplary embodiment of the present invention described above based on an operation mode will be described.

1. In maximum Cooling Mode

Figure 2:
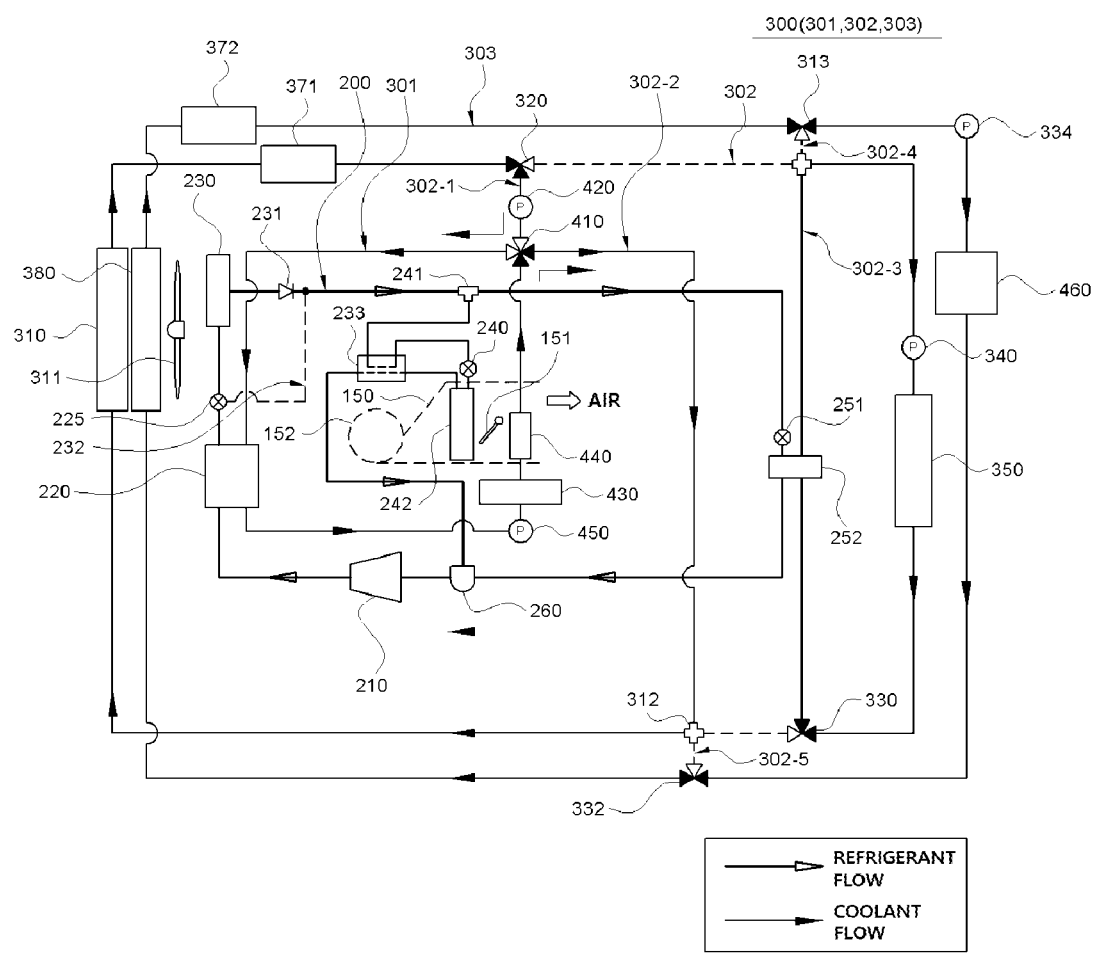
FIG. 2 is a configuration diagram showing an operating state of a heat management system according to an exemplary embodiment of the present invention in a maximum cooling mode.

FIG. 2 is a configuration diagram showing an operating state of a heat management system according to an exemplary embodiment of the present invention in a maximum cooling mode.

Referring to FIG. 2, in the refrigerant circulation line 200, the compressor 210 operates so that a high temperature and high pressure refrigerant is discharged from the compressor 210. In addition, the refrigerant discharged from the compressor 210 exchanges heat with a coolant at the water-cooled condenser 220 so as to be cooled. Subsequently, the refrigerant cooled at the water-cooled condenser 220 passes through the first expansion valve 225 completely open toward the air-cooled condenser 230 and flows into the air-cooled condenser 230, and the refrigerant exchanges heat with external air at the air-cooled condenser 230 so as to be cooled. That is, both the water-cooled condenser 220 and the air-cooled condenser 230 serve as a condenser, and the water-cooled condenser 220 condenses the refrigerant, and the air-cooled condenser 230 subcools the refrigerant. The condensed refrigerant is then branched from the refrigerant branch part 241, and part of the refrigerant passes through the refrigerant heat exchanger 233 and then is throttled, while passing through the second expansion valve 240, so as to be expanded, and thereafter, the expanded refrigerant exchanges heat with air blown by the blower 152 of the air-conditioning device 150, while passing through the evaporator 242, so that air is cooled as the refrigerant is evaporated and the cooled air is supplied to the indoor area of the vehicle to perform indoor cooling. Also, the refrigerant evaporated at the evaporator 242 exchanges heat with the refrigerant before being introduced into the second expansion valve 240, while passing through the refrigerant heat exchanger 233, and then flows into the compressor 210 again through the accumulator 260. Also, the remaining refrigerant branched from the refrigerant branch part 241 is throttled, while passing through the third expansion valve 251, so as to be expanded, and thereafter, the expanded refrigerant exchanges heat with a coolant, while passing through the chiller 252, so that the coolant may be cooled as the refrigerant is evaporated. Also, the refrigerant evaporated at the chiller 252 may flow into the compressor 210 again through the accumulator 260. Here, the refrigerant may not flow in the first refrigerant bypass line 232 by the first expansion valve 225. The refrigerant passing through the evaporator 242 and the refrigerant passing through the chiller 252 join at the accumulator 260 and flow into the compressor 210, and thereafter, the refrigerant is circulated, while repeating the process described above.

Meanwhile, the coolant of the coolant circulation line 300 is circulated by the operation of the first coolant pump 450, the second coolant pump 420, the third coolant pump 340, and the fourth coolant pump 334. In addition, the refrigerant passing through the water-cooled condenser 220, the electric component 460, and the battery 350 may be cooled by the coolant, and a heated coolant may be heat-exchanged with external air by the operation of the cooling fan 311 at the first radiator 310 and the second radiator 380 so as to be cooled.

In this case, the first directional valve 410 and the second directional valve 320 may be adjusted in a direction connecting the heating line 301 and the first cooling line 302. In more detail, in the first directional valve 410, an upper side and a left side may be connected to each other to allow the coolant to flow, and a lower side and a right side may be connected to each other to allow the coolant to flow. In addition, in the second directional valve 320, a left side and a lower side may be connected to each other to allow the coolant to flow and a right side may be blocked. In addition, in the third directional valve 330, an upper side and a right side may be connected to each other and a left side may be blocked.

Thus, the heating line 301 and the first cooling line 302 in the coolant circulation line 300 may be connected so that the coolant flows into the first radiator 310 again sequentially through the reservoir tank 371, the second directional valve 320, the second coolant pump 420, the first directional valve 410, the water-cooled condenser 220, the first coolant pump 450, the coolant heater 430, the heater core 440, the first directional valve 410, and the second coolant joint 312 from the first radiator 310, and this circulation cycle is repeated. Here, the coolant may not flow from the second directional valve 320 to the first coolant joint 313 by the second directional valve 320, and the coolant may not flow from the third directional valve 330 to the second coolant joint 312 by the third directional valve 330. Also, the coolant may flow into the chiller 252 again sequentially through the first coolant joint 313, the third coolant pump 340, the battery 350, and the third directional valve 330 from the chiller 252, and the circulation cycle is repeated. That is, the battery 350 and the chiller 252 form a cooling line with a separate closed loop through which coolant is circulated by the second directional valve 320 and the third directional valve 330, so that the battery 350 may be cooled separately.

At this time, the fourth directional valve 331 and the fifth directional valve 332 may be adjusted in a direction to cut off connection between the first cooling line 302 and the second cooling line 303. In more detail, at the fourth directional valve 331, the left side and the right side may be connected to each other to allow a coolant to flow and connection of the upper side may be blocked so that the coolant may not flow in the fourth connection line 302-4 and the fifth connection line 302-5.

Thus, the second cooling line 303 of the coolant circulation line 300 is disconnected from the heating line 301 and the first cooling line 302, so that the coolant may flow from the second radiator 380 sequentially to the reservoir tank 372, the fourth directional valve 331, the fourth coolant pump 334, the fifth directional valve 332, and flow back to the second radiator 380, and this circulation cycle is repeated.

Here, the maximum cooling mode may be operated when a temperature of the outside air is in the range of 30 □ to 45 □, and at this time, the compressor 210 may be rotated at a maximum revolution per minute (RPM). Also, when cooling of the battery 350 is not required, the third expansion valve 251 may be closed so that a refrigerant may not flow toward the chiller 252, and at this time, the third coolant pump 340 may not be operated.

2. In Mild Cooling Mode

Figure 3:
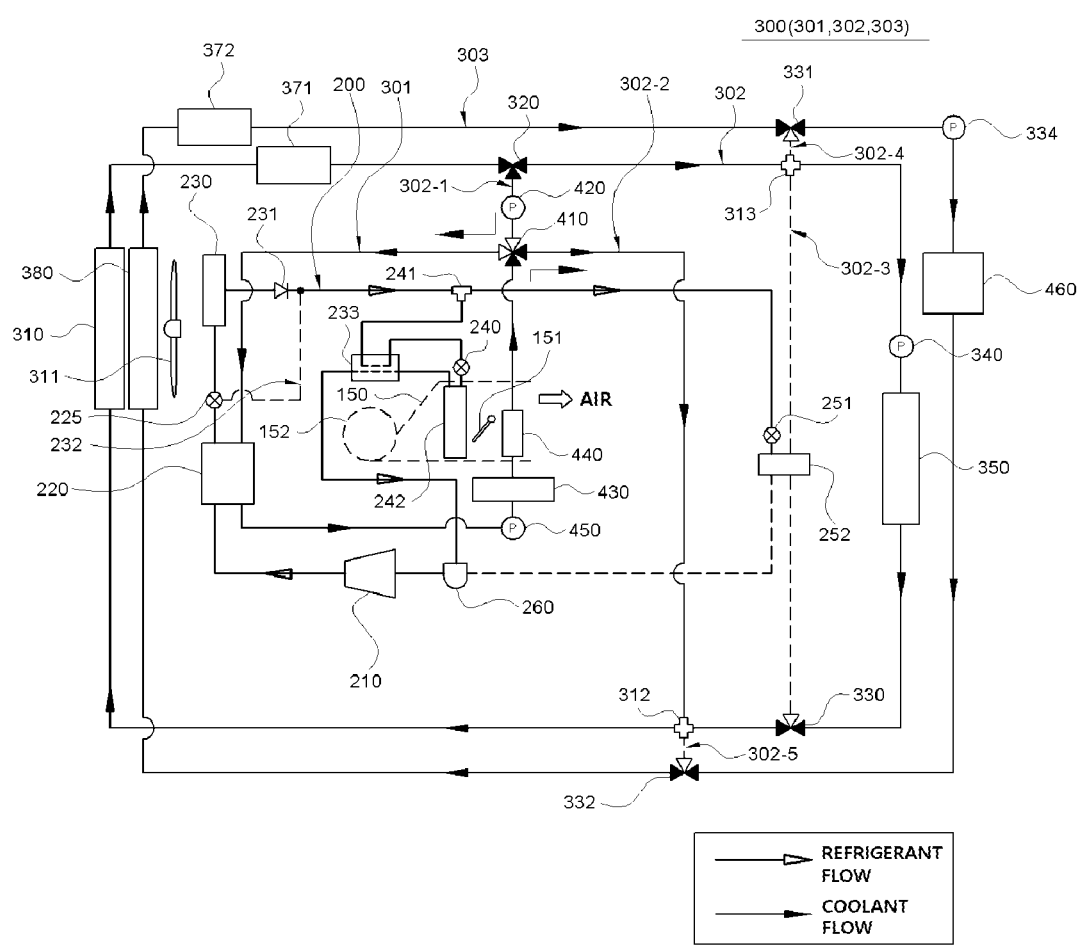
FIG. 3 is a block diagram showing an operating state in a mild cooling mode of a heat management system according to an exemplary embodiment of the present invention.

FIG. 3 is a configuration diagram showing an operating state in a mild cooling mode of a heat management system according to an exemplary embodiment of the present invention.

Referring to FIG. 3, in the refrigerant circulation line 200, the compressor 210 operates so that a high temperature and high pressure refrigerant is discharged from the compressor 210. In addition, the refrigerant discharged from the compressor 210 exchanges heat with a coolant at the water-cooled condenser 220 so as to be cooled. Subsequently, the refrigerant cooled in the water-cooled condenser 220 flows into the air-cooled condenser 230 through the first expansion valve 225 completely opened toward the air-cooled condenser 230, and the refrigerant exchanges heat with external air in the air-cooled condenser 230 so as to be cooled. That is, both the water-cooled condenser 220 and the air-cooled condenser 230 serve as a condenser to condense the refrigerant. The condensed refrigerant passes through the refrigerant branch part 241 and the refrigerant heat exchanger 233 and then is throttled, while passing through the second expansion valve 240, so as to be expanded, and thereafter, the expanded refrigerant exchanges heat with air blown by the blower 152 of the air-conditioning device 150, while passing through the evaporator 242, so that air is cooled as the refrigerant is evaporated and the cooled air is supplied to the indoor area of the vehicle to perform indoor cooling. Also, the refrigerant evaporated at the evaporator 242 exchanges heat with the refrigerant before being introduced into the second expansion valve 240, while passing through the refrigerant heat exchanger 233, and then flows into the compressor 210 again through the accumulator 260. At this time, the refrigerant may not flow in the first refrigerant bypass line 232 by the first expansion valve 225, and the third expansion valve 251 is blocked so that the refrigerant does not flow to the chiller 252. Thus, after the refrigerant passing through the evaporator 242 flows into the compressor 210 through the accumulator 260, the refrigerant is circulated, while repeating the above-described process.

Meanwhile, the coolant of the coolant circulation line 300 is circulated by the operation of the first coolant pump 450, the second coolant pump 420, the third coolant pump 340, and the fourth coolant pump 334 In addition, the refrigerant passing through the water-cooled condenser 220, the electric component 460, and the battery 350 may be cooled by the coolant, and a heated coolant may be heat-exchanged with external air by the operation of the cooling fan 311 at the first radiator 310 and the second radiator 380 so as to be cooled.

In this case, the first directional valve 410 and the second directional valve 320 may be adjusted in a direction connecting the heating line 301 and the first cooling line 302. In more detail, in the first directional valve 410, an upper side and a left side may be connected to each other to allow the coolant to flow, and a lower side and a right side may be connected to each other to allow the coolant to flow. In addition, the left side, the lower side, and the right side, which are in three directions, may be connected at the second directional valve 320, so that the coolant may flow. In addition, the left side and the right side may be connected at the third directional valve 330, and the upper side may be blocked so that the coolant may not flow in the third connection line 302-3.

Thus, the heating line 301 and the first cooling line 302 in the coolant circulation line 300 may be connected and the coolant flows into the first radiator 310 again sequentially through the reservoir tank 370, the second directional valve 320, the second coolant pump 420, the first directional valve 410, the water-cooled condenser 220, the first coolant pump 450, the coolant heater 430, the heater core 440, the first directional valve 410, and the second coolant joint 312 from the first radiator 310, and this circulation cycle is repeated. Here, part of the coolant flows to the right by the second directional valve 320 so as to flow sequentially through the first coolant joint 313, the third coolant pump 340, the battery 350, the third directional valve 330, and the second coolant joint 312, and then flows back to the first radiator 310, and this circulation cycle is repeated. In this case, the coolant that has passed through the second connection line 302-2 and the coolant that has passed through the battery 350 may join at the second coolant joint 312 and flow into the first radiator 310.

Here, the fourth directional valve 331 and the fifth directional valve 332 may be adjusted in a direction to block connection between the first cooling line 302 and the second cooling line 303. In more detail, the left side and the right side of the fourth directional valve 331 may be connected to each other to allow a coolant to flow and the lower side thereof may be disconnected, and the left side and the right side of the fifth directional valve 332 may be connected to each other to allow the coolant to flow and the upper side thereof may be disconnected so that the coolant may not flow in the fourth connection line 302-4 and the fifth connection line 302-5.

Thus, the second cooling line 303 of the coolant circulation line 300 may be disconnected from the heating line 301 and the first cooling line 302, so that the coolant flows to the second radiator 380 sequentially through the reservoir tank 372, the fourth directional valve 331, the fourth coolant pump 334, the fifth directional valve 332, from the second radiator 380, and this circulation cycle is repeated.

Here, the mild cooling mode may be operated when a temperature of the outside air is in the range of 15 □ to 25 □, and here, the battery may be cooled by the first radiator so that the refrigerant may not be circulated through the chiller. Therefore, there is an advantage of reducing power consumed for driving the compressor.

3. Battery-Only Cooling Mode

Figure 4:
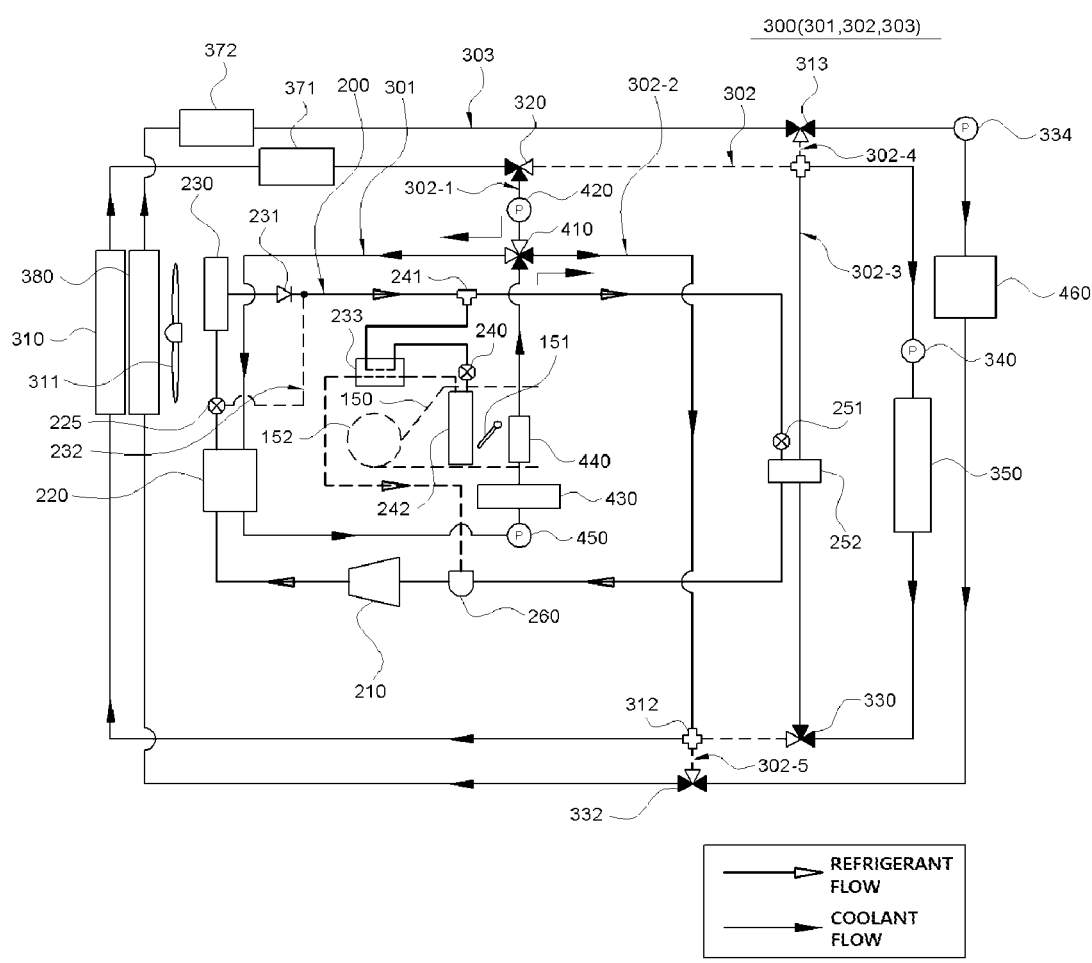
FIG. 4 is a configuration diagram showing an operating state of a heat management system according to an exemplary embodiment of the present invention in a mild cooling mode.

FIG. 4 is a block diagram showing an operating state of a heat management system according to an embodiment of the present invention in a battery-only cooling mode.

Referring to FIG. 4, in the refrigerant circulation line 200, the compressor 210 is operated so that a high temperature and high pressure refrigerant is discharged from the compressor 210. In addition, the refrigerant discharged from the compressor 210 is cooled by heat exchange with the coolant in the water-cooled condenser 220. Subsequently, the refrigerant cooled in the water-cooled condenser 220 passes through the first expansion valve 225 completely opened toward the air-cooled condenser 230, flows into the air-cooled condenser 230, and exchanges heat with external air in the air-cooled condenser 230 so as to be cooled. That is, both the water-cooled condenser 220 and the air-cooled condenser 230 serve as a condenser to condense the refrigerant. The condensed refrigerant then passes through the refrigerant branch part 241 and is throttled to be expanded, while passing through the third expansion valve 251, and thereafter, the expanded refrigerant exchanges heat with the coolant, while passing through the chiller 252, so as to be evaporated to cool the coolant, and the battery 350 is cooled using the cooled coolant. Also, the refrigerant evaporated through the chiller 252 passes through the accumulator 260 and flows into the compressor 210 again. At this time, the refrigerant may not flow in the first refrigerant bypass line 232 by the first expansion valve 225, and the second expansion valve 240 may be closed so that the refrigerant may not flow to the evaporator 242. Thus, the refrigerant is circulated while repeating the process as described above.

Meanwhile, the coolant of the coolant circulation line 300 is circulated by the operation of the first coolant pump 450, the second coolant pump 420, the third coolant pump 340, and the fourth coolant pump 334. In addition, the refrigerant passing through the water-cooled condenser 220, the electric component 460, and the battery 350 may be cooled by the coolant, and the heated coolant may be heat-exchanged with external air by the operation of the cooling fan 311 in the first radiator 310 and the second radiator 380 so as to be cooled.

In this case, the first directional valve 410 and the second directional valve 320 may be adjusted in a direction to connect the heating line 301 and the first cooling line 302. More specifically, in the first directional valve 410, the upper side and the left side may be connected to each other to circulate the coolant and the lower side and the right side may be connected to each other to allow the coolant to flow. In addition, in the second directional valve 320, the left side and the lower side may be connected to each other to allow the coolant to flow and the right side may be blocked. In addition, in the third directional valve 330, the upper side and the right side may be connected to each other and the left side may be blocked.

Thus, in the coolant circulation lines 200, the heating line 301 and the first cooling line 302 are connected, so that the coolant flows back to the first radiator 310 sequentially through the reservoir tank 371, the second directional valve 320, the second coolant pump 420, the first directional valve 410, the water-cooled condenser 220, the first coolant pump 450, the coolant heater 430, the heater core 440, the first directional valve 410, and the second coolant joint 312 from the first radiator 310, and this circulation cycle is repeated. Here, the coolant may not flow from the second directional valve 320 to the first coolant joint 313 by the operation of the second directional valve 320, and the coolant may not flow from the third directional valve 330 to the second coolant joint 312 by the operation of the third directional valve 330. Also, the coolant flows back to the chiller 252 sequentially through the first coolant joint 313, the third coolant pump 340, the battery 350, and the third directional valve 330 from the chiller 252, and this circulation cycle is repeated. That is, a cooling line is formed as a separate closed loop in which the coolant is circulated by the second directional valve 320 and the third directional valve 330, so that the battery 350 may be cooled separately.

At this time, the fourth directional valve 331 and the fifth directional valve 332 may be adjusted in a direction to cut off connection between the first cooling line 302 and the second cooling line 303. In more detail, in the fourth directional valve 331, the left side and the right side may be connected to each other to allow a coolant to flow and the lower side may be blocked, and in the fifth directional valve 332, the left and the right side may be connected to each other to allow a coolant to flow and the upper side may be blocked so that a coolant may not flow in the fourth connection line 302-4 and the fifth connection line 302-5.

Thus, the second cooling line 303 of the coolant circulation line 300 is disconnected from the heating line 301 and the first cooling line 302, so that the coolant flows back to the second radiator 380 sequentially through the reservoir tank 372, the fourth directional valve 331, the fourth coolant pump 334, and the fifth directional valve 332 from the second radiator 380, and this circulation cycle is repeated.

Here, the battery-only cooling mode may be activated when the battery needs to be rapidly charged without cooling the room. In this case, the compressor 210 may be rotated at a maximum RPM.

4. In Maximum Heating Mode

Figure 5:
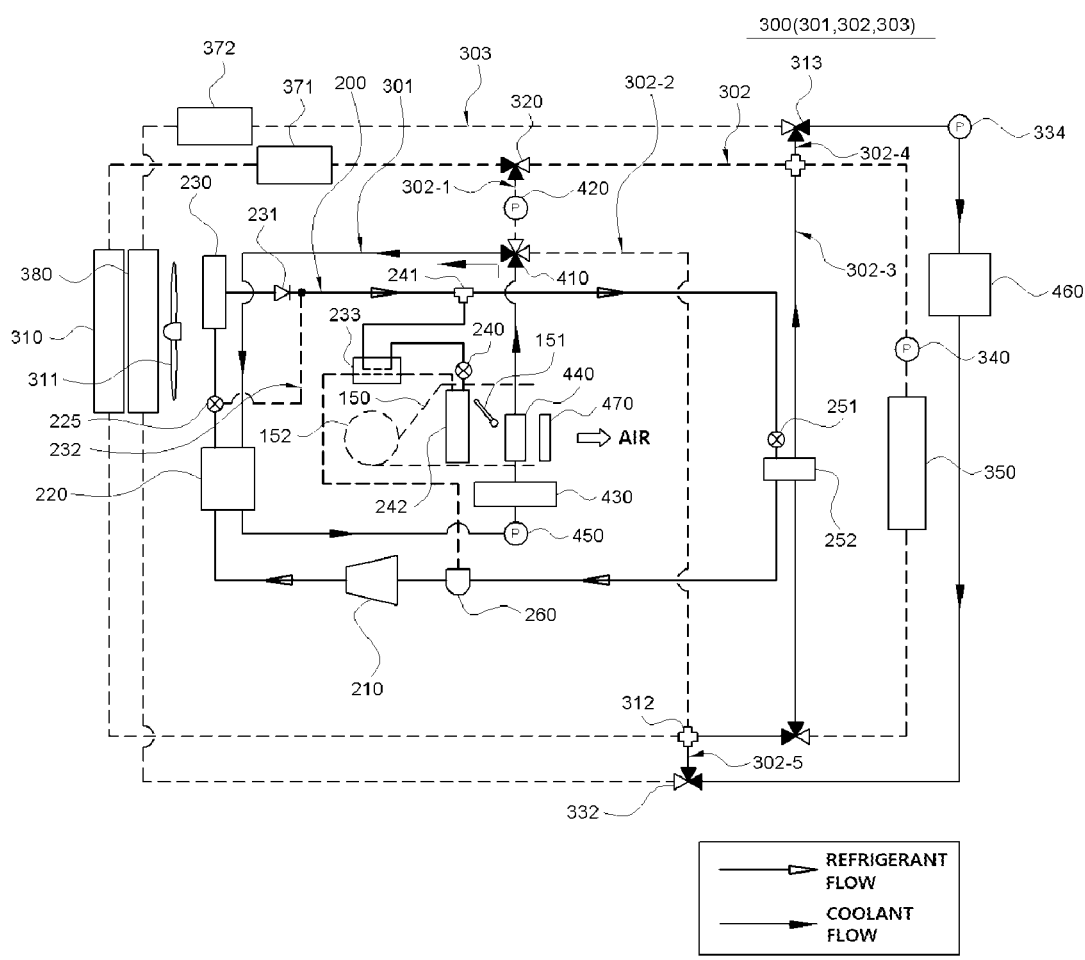
FIGS. 5 and 6 are block diagrams showing an operating state in a maximum heating mode of a heat management system according to an exemplary embodiment of the present invention.

FIG. 5 is a configuration diagram showing an operating of a heat management system according to an embodiment of the present invention state in a maximum heating mode.

Referring to FIG. 5, in the refrigerant circulation line 200, the compressor 210 is operated so that a high temperature and high pressure refrigerant is discharged from the compressor 210. In addition, the refrigerant discharged from the compressor 210 exchanges heat with a coolant in the water-cooled condenser 220 so as to be cooled. Subsequently, the refrigerant cooled in the water-cooled condenser 220 is throttled, while passing through the first expansion valve 225, so as to be expanded, and the expanded refrigerant exchanges heat with external air, while passing through the air-cooled condenser 230, so that the refrigerant is evaporated to absorb heat of external air. Thereafter, the refrigerant passes through the refrigerant branch part 241 and passes through the third expansion valve 251 in a fully opened state, and flows into the chiller 252. In the chiller 252, the refrigerant and the coolant are heat exchanged to heat the refrigerant. Then, the refrigerant that has passed through the chiller 252 passes through the accumulator 260 and flows into the compressor 210 again. Here, the refrigerant may not flow through the first refrigerant bypass line 232 by the first expansion valve 225, and the second expansion valve 240 may be closed so that the refrigerant may not flow to the evaporator 242. Thus, the refrigerant is circulated while repeating the process as described above.

As another example, the first expansion valve 225 may bypass the refrigerant to the first refrigerant bypass line 232 instead of the air-cooled condenser 230. In a heating mode in the winter, the air-cooled condenser 230 disposed outdoors and absorbing heat may have icing according to a low outdoor temperature. To prevent this, the refrigerant is bypassed to the first refrigerant bypass line 232, and the refrigerant may be expanded in the second expansion valve 240 or at the time of coolant waste heat recovery during dehumidification. In addition, in the heating mode in the winter, when there is a large amount of waste heat recovery from batteries and electronic components, heat dissipation may occur in the air-cooled condenser 230 as pressure at the front of the compressor, that is, a low pressure side, increases in the refrigerant flow direction. When heat dissipation occurs in the air-cooled condenser 230, a loss in heating performance occurs, and a refrigerant is bypassed to prevent this.

Meanwhile, the coolant of the coolant circulation line 300 is circulated by the operation of the first coolant pump 450 and the fourth coolant pump 334. In addition, the coolant may be heated while passing through the water-cooled condenser 220, heated by the coolant heater 430, heated by waste heat of the electric component 460, and cooled while passing through the chiller 252.

In this case, the first directional valve 410 may be adjusted in a direction to disconnect the heating line 301 and the first cooling line 302. In more detail, the left side and the lower side of the first directional valve 410 are connected to each other so that the coolant flows, and the left side may be blocked. In addition, the upper side and the left side of the third directional valve 330 may be connected to each other and the right side may be blocked. Thus, the coolant of the heating line 301 flows back to the first coolant pump 450 sequentially through the coolant heater 430, the heater core 440, the first directional valve 410, and the water-cooled condenser 220 from the first coolant pump 450, and the circulation cycle is repeated. Here, the second directional valve 320 may be operated so that the left side and the lower side are connected to each other and the right side is blocked as shown, but may be in a state in which the connection is cut off in all three directions.

In addition, the fourth directional valve 331 and the fifth directional valve 332 may be adjusted in a direction to connect the first cooling line 302 and the second cooling line 303. In more detail, in the fourth directional valve 331, the right side and the lower side are connected to each other so that the coolant flows, and the left side may be blocked. In addition, in the fifth directional valve 332, the right side and the upper side may be connected to each other so that the coolant flows and the left side may be blocked. Thus, the coolant of the first cooling line 302 and the second cooling line 303 may flow back to the fourth coolant pump 334 sequentially through the electric component 460, the fifth directional valve 332, the second coolant joint 312, the third directional valve 330, the chiller 252, the first coolant joint 313, and the fourth directional valve 331 from the fourth coolant pump 334, and the circulation cycle is repeated.

Here, in the first cooling line 302, the coolant may not flow in a portion other than the portion from the second coolant joint 312 to the third directional valve 330, and in the second cooling line 303, the coolant may not flow from the fifth directional valve 332 to the fourth directional valve 331 through the water-cooled condenser 220, the second radiator 380, and the reservoir tank 372 by the directional valves.

In addition, the coolant flowing along the heating line 301 exchanges heat with the air blown by the blower 152 of the air-conditioning device 150 while passing through the heater core 440 to heat the air, and the heated air is supplied to the interior of the vehicle to perform indoor heating. Also, an air heating type heater 470 heating an indoor area by directly heating air flowing into the indoor area may be further provided. The air heating type heater 470 may be configured separately from the heating line 301. That is, the air heating type heater 470 may be provided near the heater core 440, and the air heating type heater 470 may be formed of a PTC heater operated by electricity, for example, to rapidly heat air. Thus, it is possible to increase speed effectiveness of indoor heating. Here, since the coolant previously heated by the coolant heater 430 flows into the heater core 440, a low voltage PTC heater having a relatively small heat generation capacity may be used as the air heating type heater 470, and accordingly, the air heating type heater 470 may be configured at low cost, compared with a high voltage PTC heat. Alternatively, when the air heating type heater 470 is provided near the heater core 440, the coolant heater 430 may be installed at the first cooling line 302 near the battery 350 rather than the heating line 301. Accordingly, an air heating type heater may be used for heating and a coolant heater may be separately applied to increase a temperature of the battery, thereby increasing efficiency and separately controlling the battery.

Here, the maximum heating mode may be operated when the temperature of external air is in the range of −20 ☐ to −5 ☐, and the battery 350 may be cooled by controlling the third directional valve 330 and the third coolant pump 340.

Figure 6:
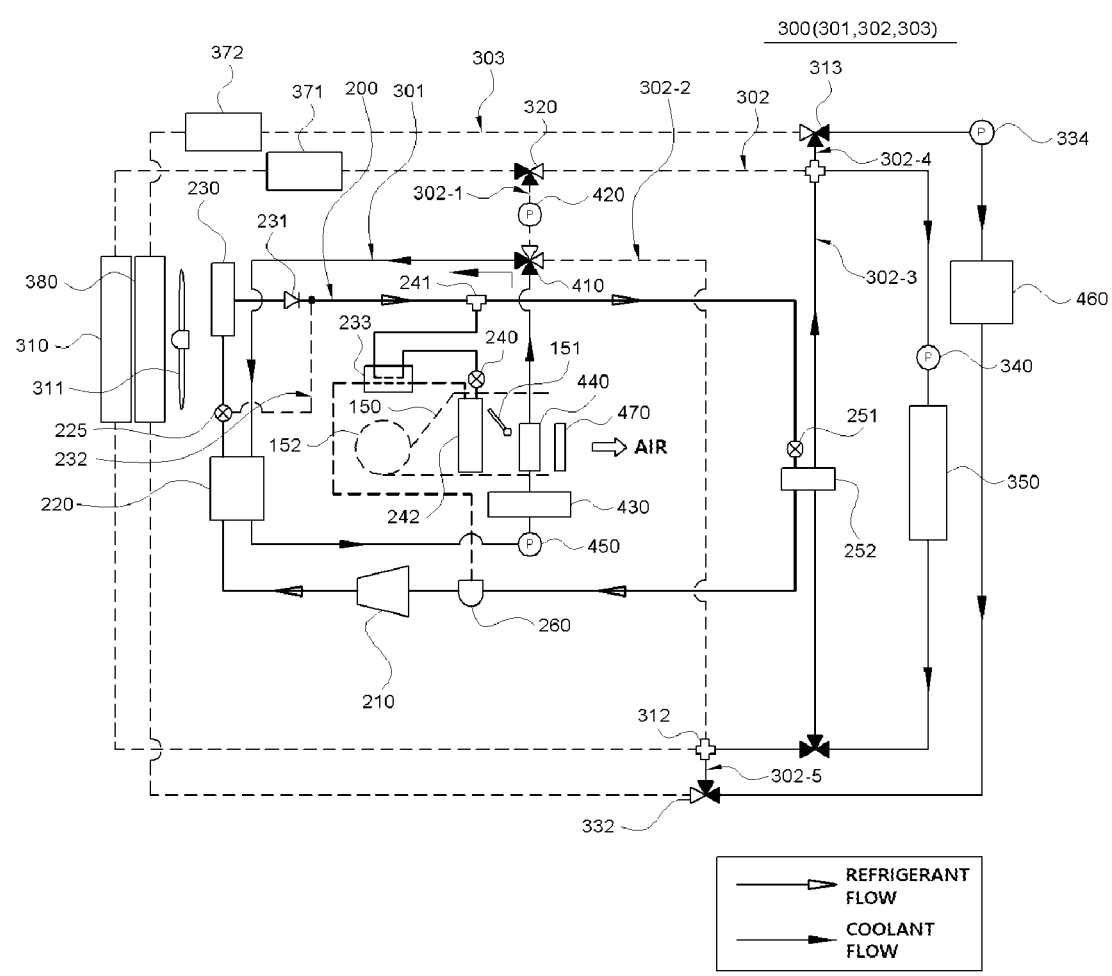

In addition, referring to FIG. 6, in the maximum heating mode, the left side, the upper side, and the right side of the third directional valve 330 may all be connected to use waste heat of the battery 350 for heating, as well as waste heat of the electric component 460.

5. In Battery Temperature Rising Mode

Figure 7:
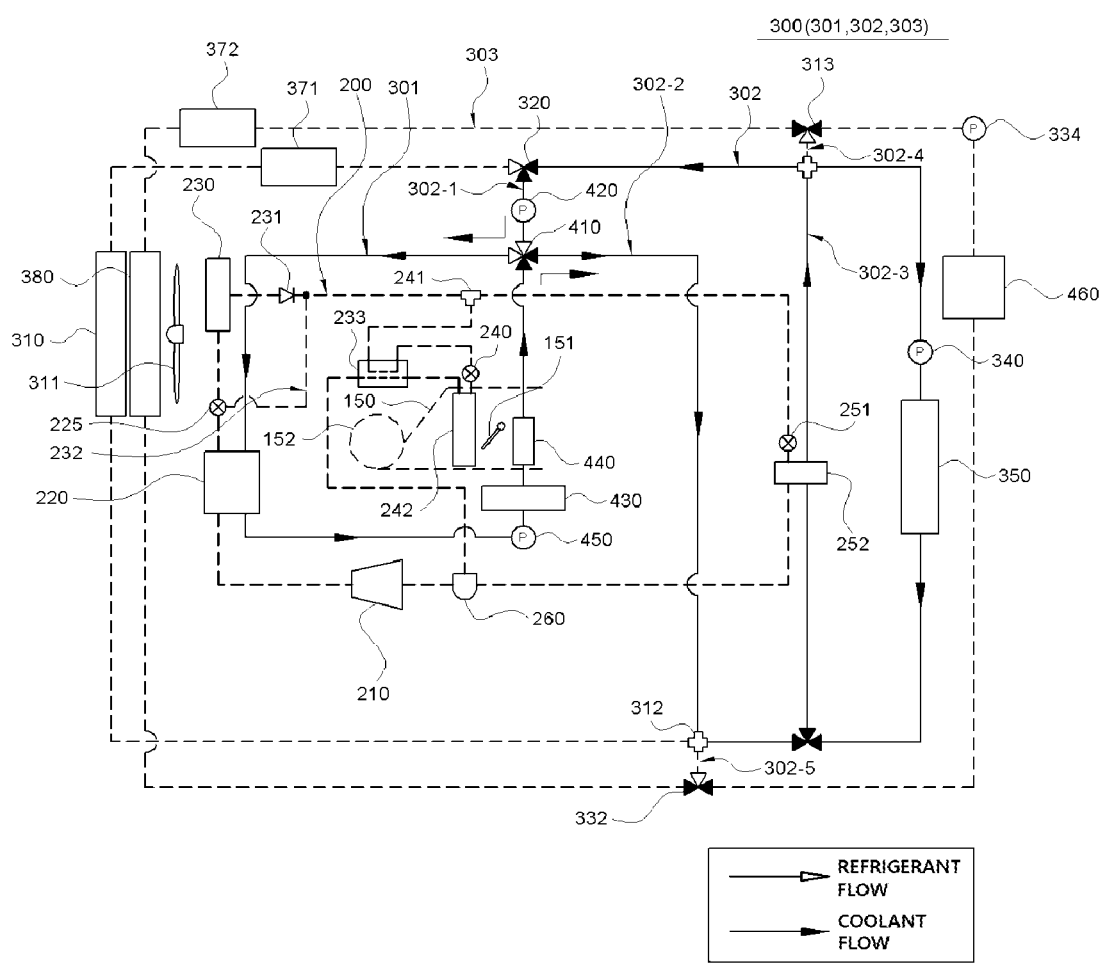
FIG. 7 is a configuration diagram showing an operating state of a heat management system according to an exemplary embodiment of the present invention in a battery temperature rising mode (or a battery heating mode).

FIG. 7 is a configuration diagram showing an operating state of a heat management system according to an exemplary embodiment of the present invention in a battery temperature rising mode.

Referring to FIG. 7, the refrigerant circulation line 200 does not operate, so that the refrigerant is not circulated.

Meanwhile, the coolant of the coolant circulation line 300 is circulated by the operation of the first coolant pump 450, the second coolant pump 420, and the third coolant pump 340. In addition, the coolant may be heated by waste heat of the coolant heater 430. In this case, the first directional valve 410 and the second directional valve 320 may be adjusted in a direction to connect the heating line 301 and the first cooling line 302. In more detail, in the first directional valve 410, the upper side and the left side may be connected so that the coolant flows, and the lower side and the right side may be connected so that the coolant may flow. In addition, in the second directional valve 320, the right side and the lower side may be connected so that the coolant may flow, and the left side may be blocked. In addition, in the third directional valve 330, the left side, the upper side, and the right side may all be connected to each other.

Accordingly, the coolant may flow back to the second coolant pump 420 sequentially through the first directional valve 410, the water-cooled condenser 220, the first coolant pump 450, the coolant heater 430, the heater core 440, the first directional valve 410, the second coolant joint 312, the third directional valve 330, the chiller 252, the first coolant joint 313, and the second directional valve 320 from the second coolant pump 420 so as to be circulated, and the circulation cycle is repeated. Here, the coolant passing through the battery 350 may join at the third directional valve 330, flow upward, and may then be branched to both sides at the first coolant joint 313. Here, the coolant may not flow from the second directional valve 320 to the second coolant joint 312 through the first radiator 310 by the second directional valve 320. Also, since the second cooling line 303 does not operate, the coolant may not flow in the second cooling line 303, and the coolant may not flow in the fourth connection line 302-4 and the fifth connection line 302-5 by the fourth directional valve 331 and the fifth directional valve 332.

Thus, the heated coolant may heat the battery 350, so that initial performance of the battery 350 may be quickly improved in the winter when an outside temperature is low.

Here, the battery temperature rising mode may be operated when a temperature of external air is −20° C. to −5° C.

6. In Mild Heating Mode

Figure 8:
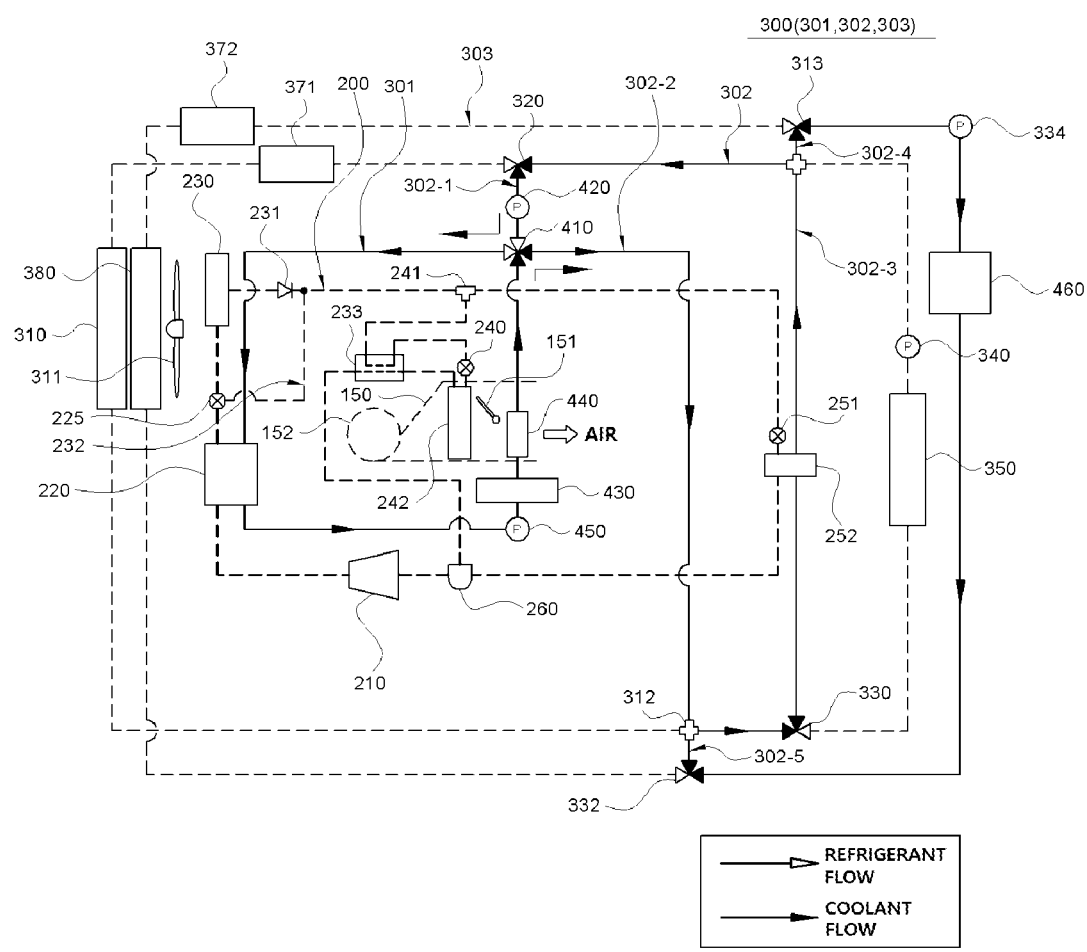
FIG. 8 is a configuration diagram showing an operating state in a mild heating mode of a heat management system according to an exemplary embodiment of the present invention.

FIG. 8 is a block diagram showing an operating state of a heat management system according to an exemplary embodiment of the present invention in a mild heating mode.

Referring to FIG. 8, the refrigerant circulation line 200 does not operate, so that the refrigerant is not circulated.

Meanwhile, the coolant of the coolant circulation line 300 may be circulated by the operation of the first coolant pump 450, the second coolant pump 420, and the fourth coolant pump 334. Also, the coolant may be heated only by waste heat of the electric component 460. In this case, the first directional valve 410 and the second directional valve 320 may be adjusted in a direction connecting the heating line 301 and the cooling line 302. In more detail, in the first directional valve 410, an upper side and a left side may be connected to each other to allow the coolant to flow, and a lower side and a right side may be connected to each other to allow the coolant to flow. In addition, in the second directional valve 320, the right side and the lower side may be connected to each other to allow the coolant to flow and the left side may be blocked. In addition, the left and upper sides of the third directional valve 330 may be connected to each other and the right side may be blocked. In addition, the fourth directional valve 331 and the fifth directional valve 332 may be in a direction connecting the first cooling line 302 and the second cooling line 303. In more detail, in the fourth directional valve 331, the right side and the lower side may be connected to each other so that the coolant may flow and the left side may be disconnected, and in the fifth directional valve 332, the right side and the upper side may be connected so that the coolant may flow and the left side may be disconnected.

Accordingly, the coolant may flow back to the second coolant pump 420 sequentially through the first directional valve 410, the water-cooled condenser 220, the first coolant pump 450, the coolant heater 430, the heater core 440, the first directional valve 410, the second coolant joint 312, the third directional valve 330, the chiller 252, the first coolant joint 313, and the second directional valve 320 from the second coolant pump 420 so as to be circulated. This circulation cycle is repeated.

Here, the coolant may not flow from the second directional valve 320 to the second coolant joint 312 through the first radiator 310 by the second directional valve 320. In addition, the coolant may not flow in the second cooling line 303 from the fourth directional valve 331 to the fifth directional valve 332 through the second radiator 380 by the fourth directional valve 331 and the fifth directional valve 332. In addition, the coolant may not flow from the third directional valve 330 to the battery 350, the third coolant pump 340, and the first coolant joint 313 by the third directional valve 330.

Thus, when demand for heating is low, the coolant may be heated using only waste heat of the electric component 460 to be utilized for indoor heating.

Here, the mild heating mode may be operated when the temperature of the outside air is in the range of 5° C. to 15° C.

7. In Dehumidification Heating Mode

Figure 9:
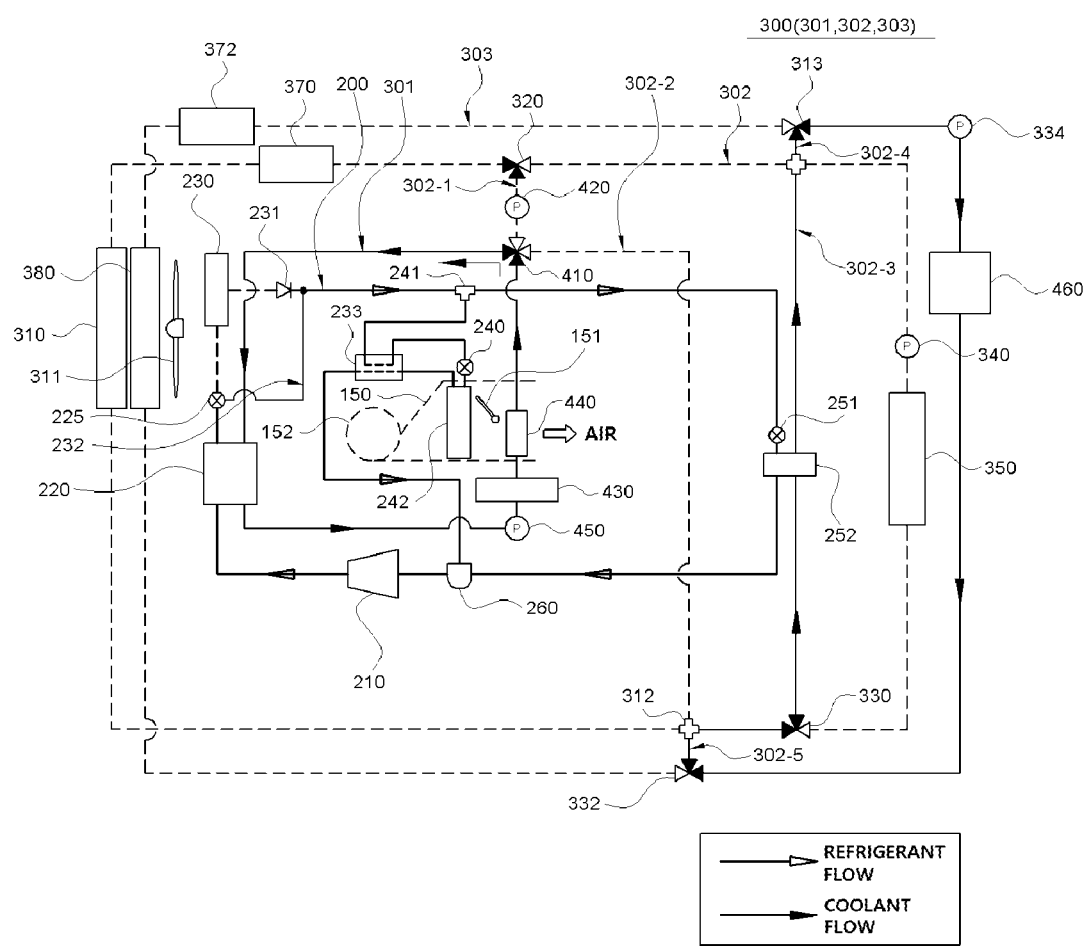
FIG. 9 is a configuration diagram showing an operating state of a heat management system according to an exemplary embodiment of the present invention in a dehumidification heating mode.

FIG. 9 is a block diagram showing an operating state in a dehumidification heating mode of a heat management system according to an exemplary embodiment of the present invention.

Referring to FIG. 9, in the refrigerant circulation line 200, the compressor 210 operates so that a high temperature and high pressure refrigerant is discharged from the compressor 210. In addition, the refrigerant discharged from the compressor 210 exchanges heat with a coolant at the water-cooled condenser 220 so as to be cooled. Subsequently, the refrigerant cooled in the water-cooled condenser 220 is throttled while passing through the first expansion valve 225 so as to be expanded, and the expanded refrigerant passes through the first refrigerant bypass line 232 and is branched at the branch part 241. Part of the refrigerant passes through the refrigerant heat exchanger 233 and then bypasses the second expansion valve 240, and thereafter, the refrigerant passes through the evaporator 242 and exchanges heat with air blown by the blower 152 of the air-conditioning device 150 so that moisture in the air is removed. The refrigerant that has passed through the evaporator 242 passes through the refrigerant heat exchanger 233, passes through the accumulator 260, and flows into the compressor 210 again. In addition, the rest of the refrigerant branched from the refrigerant branch part 241 bypasses the third expansion valve 251, passes through the chiller 252, joins at the accumulator 260, and flows into the compressor 210. While repeating the process described above, the refrigerant is circulated. At this time, the refrigerant may not pass through the air-cooled condenser 230 by the first expansion valve 225.

In this manner, when the air-cooled condenser 230 absorbs heat during dehumidification heating, heat absorption performance in the evaporator 242 may be insufficient, and when the air-cooled condenser 230 dissipates heat, heating performance may be deteriorated. In order to prevent this, in this embodiment, the refrigerant bypasses the air-cooled condenser 230, thereby sufficiently securing dehumidification heating performance.

Meanwhile, the coolant of the coolant circulation line 300 is circulated by the operation of the first coolant pump 450 and the fourth coolant pump 334. In addition, the coolant may be heat-exchanged with the refrigerant in the water-cooled condenser 220 so as to be heated, and may be heated using waste heat of the electric component 460. In this case, the first directional valve 410 may be adjusted in a direction to disconnect the heating line 301 and the first cooling line 302. In more detail, in the first directional valve 410, the upper side and the right side may be connected to each other and the lower side and the left side may be connected to each other so that the coolant may flow. Here, the second directional valve 320 may be operated such that the left side and the lower side are connected to each other and the right side is blocked, but all of the left side, the lower side, and the right side may be disconnected in three directions.

Thus, the coolant of the heating line 301 sequentially passes through the first coolant pump 450, the coolant heater 430, the heater core 440, the first directional valve 410, and the water-cooled condenser 220 and flows back to the first coolant pump 450, and this circulation cycle is repeated. In addition, the coolant of the first cooling line 302 and the second cooling line 303 disconnected from the heating line 301 sequentially passes from the fourth coolant pump 334 to the electric component 460, the fifth directional valve 332, the second coolant joint 312, the third directional valve 330, the chiller 252, the first coolant joint 313, and the fourth directional valve 331, and then flows back to the fourth coolant pump 334, and this circulation cycle is repeated. At this time, the coolant may not flow from the third directional valve 330 to the battery 350, the third coolant pump 340, and the first coolant joint 313 by the third directional valve 330. In addition, by the directional valves, the coolant may not flow in a portion of the first cooling line 302 except for a portion from the second coolant joint 312 to the third directional valve 330, and the coolant may not flow in a portion of the second cooling line 303 from the fifth directional valve 332 to the fourth directional valve 331 through the water-cooled condenser 220, the second radiator 380, and the reservoir tank 372.

Here, the coolant heater 430 may not be operated, and air dehumidified while passing through the evaporator 242 may be heated while passing through the heater core 440 so as to be used for indoor heating.

Here, the dehumidification heating mode may be operated when a temperature of outside air is in the range of 5° C. to 15° C.

Figure 10:
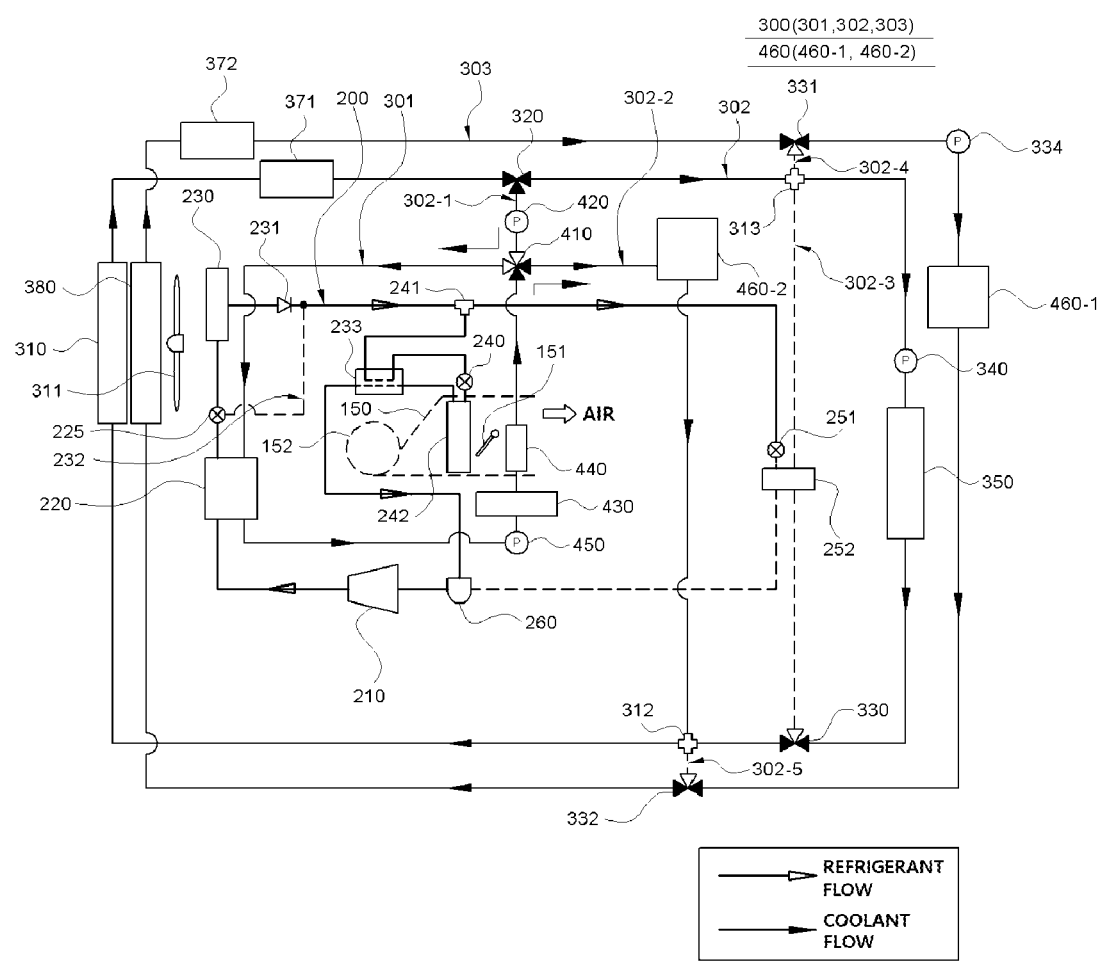
FIG. 10 is a configuration diagram showing an exemplary embodiment for an arrangement of an electric component according to the present invention.

FIG. 10 is a block diagram showing an embodiment of an arrangement of an electric component according to the present invention.

Referring to FIG. 10, a drive motor of the electric component 460 may include a front wheel drive motor and a rear wheel drive motor. Any one of a first electric component 460-1 including the front wheel drive motor and a second electric component 460-2 including the rear wheel drive motor may be disposed on the first cooling line 302 and the other may be disposed on the second cooling line 303. As an example, as illustrated, the first electric component 460-1 including the front wheel drive motor may be disposed on the first cooling line 302, and the first electric component 460-1 may be disposed on the second connection line 302-2 of the first cooling line 302. In addition, the second electric component 460-2 including the rear wheel drive motor may be disposed on the second cooling line 33 and may be disposed at the rear of the fourth coolant pump 334 in the flow direction of the coolant. Here, in consideration of a load and applicability of the drive motors, the positions of the first electric component 460-1 including the front-wheel drive motor and the second electric component 460-2 including the rear-wheel drive motor may be interchanged so as to be disposed.

In addition, the second cooling line 303 may be configured not to pass through the water-cooled condenser 220, and the water-cooled condenser 220 may be connected to only the heating line 301 of the coolant circulation line 300 to perform heat exchange. This is because a temperature of the coolant passing through the second radiator 380 is higher than a temperature of the coolant passing through the first radiator 310. Thus, a structure of the water-cooled condenser may be simplified, and the second cooling line 303 to which the electric component 460 is connected may not be operated when an air conditioner is operated.

Figure 11:
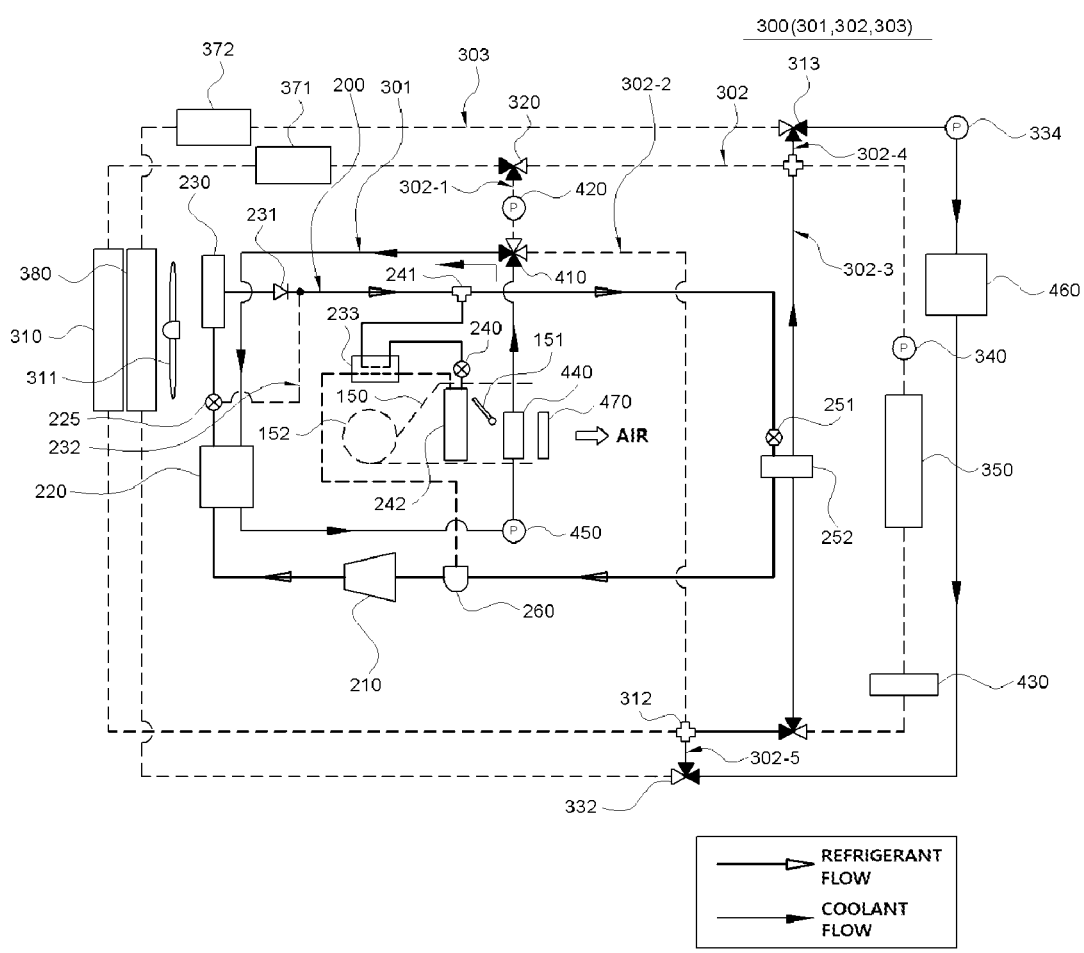
FIG. 11 is a configuration diagram showing an exemplary embodiment for an arrangement of a cooling heater and an air heating type heater according to the present invention.

FIG. 11 is a block diagram showing an embodiment of an arrangement of a coolant heater and an air heating type heater according to the present invention.

Referring to FIG. 11, when the air heating type heater 470 is provided near the heater core 440, the coolant heater 430 may be installed at the first cooling line 302 adjacent to the battery 350 rather than the heating line 301. Thus, since the air heating type heater is used for heating and the coolant heater is separately applied to increase a temperature of the battery, efficiency may be increased and the battery may be separately controlled.

In addition, the reservoir tanks may be disposed on the cooling lines, respectively, such that one reservoir tank 371 is disposed on the first cooling line 302 and the other reservoir tank 372 is disposed on the second cooling line 303.

Figure 12:
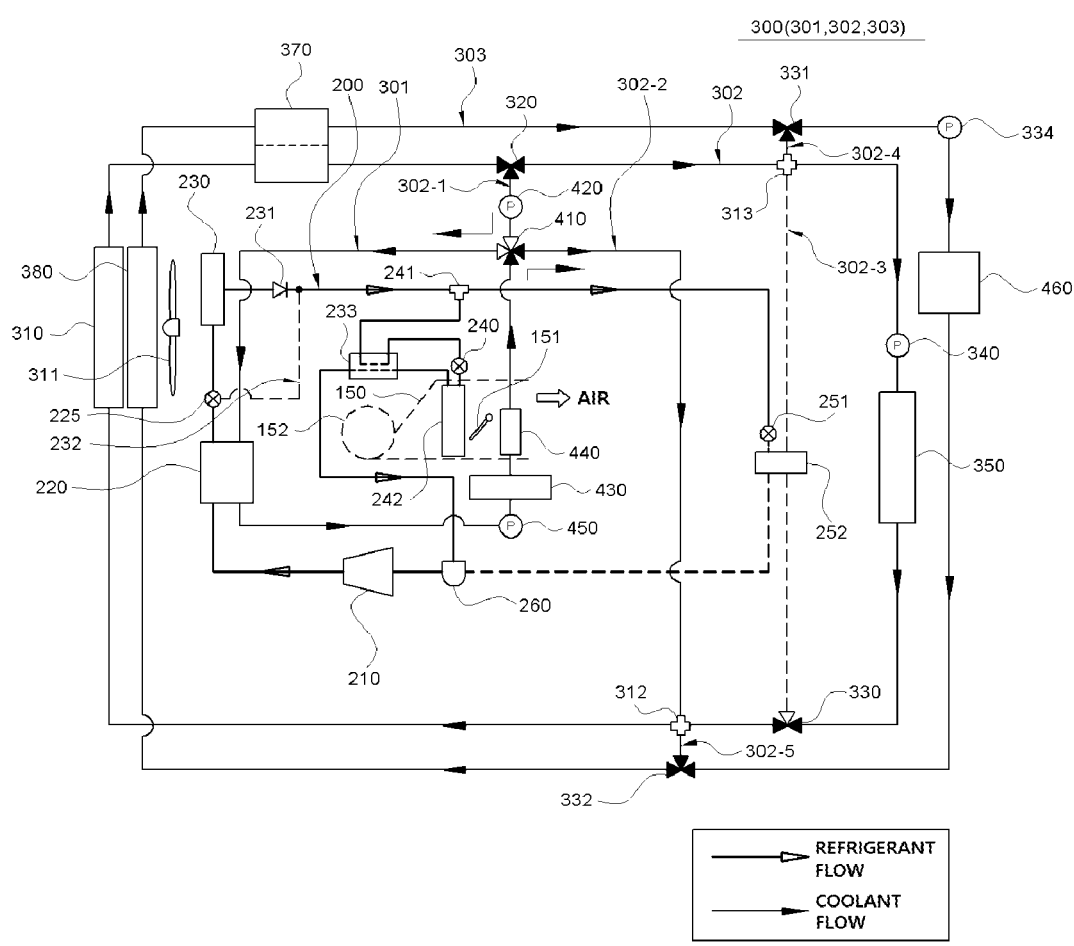
FIG. 12 is a configuration diagram showing an exemplary embodiment of an arrangement of a reservoir tank according to the present invention.

FIG. 12 is a block diagram showing an embodiment of an arrangement of a reservoir tank according to the present invention.

Referring to FIG. 12, the reservoir tank may be configured as an integral reservoir tank 370 to reduce the number of parts, and in the integral reservoir tank 370, an internal space may be is partitioned by a partition so that a coolant flowing along the first cooling line 302 and a coolant flowing along the second cooling line 303 may not be mixed with each other therein.

It will be obvious to those skilled in the art to which the present invention pertains that the present invention described above is not limited to the above-mentioned exemplary embodiments and the accompanying drawings, but may be variously substituted, modified, and altered without departing from the scope and spirit of the present invention.

DETAILED DESCRIPTION OF MAIN ELEMENTS

150: air-conditioning device, 151: temperature control door
152: blower
200: refrigerant circulation line, 210: compressor
220: water-cooled condenser, 225: first expansion valve
230: air-cooled condenser, 231: check valve
232: first refrigerant bypass line, 233: refrigerant heat exchanger
240: second expansion valve, 241: refrigerant branch part
242: evaporator, 251: third expansion valve,
252: chiller, 260: accumulator
300: coolant circulation line, 301: heating line
302: first cooling line, 302-1: first connection line
302-2: second connection line, 302-3: third connection line
302-4: fourth connection line, 302-5: fifth connection line
303: second cooling line
310: first radiator, 311: cooling fan
312: second coolant joint, 313: first coolant joint
320: second directional valve, 330: third directional valve
331: fourth directional valve, 332: fifth directional valve
334: fourth coolant pump, 340: third coolant pump 350: battery
370, 371, 372: reservoir tank
380: second radiator
410: first directional valve, 420: second coolant pump
430: coolant heater, 440: heater core
450: first coolant pump, 460: electric component
460-1: first electric component, 460-2: second electric component
470: air heating type heater

The invention claimed is:

1. A heat management system comprising:
a refrigerant circulation line including a compressor, a water-cooled condenser, a first expansion valve, an air-cooled condenser, a second expansion valve, an evaporator, a refrigerant heat exchanger heat-exchanging a refrigerant flowing into the second expansion valve and the refrigerant discharged from the evaporator with each other, and a first refrigerant bypass line allowing the refrigerant passing through the water-cooled condenser to bypass the first expansion valve and the air-cooled condenser, and circulating the refrigerant to cool an indoor area;
a heating line heating the indoor area by circulating a coolant heat-exchanged with the refrigerant through the water-cooled condenser;
a first cooling line cooling a battery by circulating the coolant heat-exchanged with air or the refrigerant; and
a second cooling line cooling an electric component including a drive motor by circulating the coolant heat-exchanged with air or the refrigerant.

2. The heat management system of claim 1, wherein the water-cooled condenser receives coolant directly from the heating line.

3. The heat management system of claim 1, wherein the first cooling line includes a first radiator for cooling the coolant with air.

4. The heat management system of claim 1, wherein the first cooling line and the second cooling line each include a reservoir tank and for storing the coolant, respectively.

5. The heat management system of claim 1, wherein the first cooling line and the second cooling line include an integral reservoir tank for storing the coolant, and an internal space of the reservoir tank is partitioned by a partition so that the coolant flowing along the first cooling line and the coolant flowing along the second cooling line are not mixed with each other in the reservoir tank.

6. The heat management system of claim 1, wherein the heating line includes a heater core heating the indoor area using heated air by heat-exchanging the coolant heat-exchanged with the refrigerant through the water-cooled condenser and air introduced to the indoor area, and
the heat management system further comprising:
an air heating heater configured separately from the heating line and heating an indoor area by directly heating air introduced to the indoor area.

7. The heat management system of claim 1, wherein, in a battery only cooling mode, the second expansion valve is closed and the refrigerant does not pass through the evaporator.

8. The heat management system of claim 1, wherein, in a battery temperature rising mode, the refrigerant is not circulated in the refrigerant circulation line.

9. The heat management system of claim 1, wherein, in a battery temperature rising mode, the refrigerant is not circulated in the second cooling line.

10. The heat management system of claim 1, wherein, in a mild heating mode, the refrigerant is not circulated in the refrigerant circulation line.

11. The heat management system of claim 1, wherein, in a dehumidification heating mode, the refrigerant does not flow to the air-cooled condenser, and the refrigerant flows to the first refrigerant bypass line.

12. The heat management system of claim 1, wherein the first cooling line includes a first connection line branched from one side of the first cooling line and connected to the heating line; and a second connection line branched from the other side of the first cooling line and connected to the heating line.

13. The heat management system of claim 12, wherein the first connection line, the second connection line, and the heating line are connected to a first directional valve, and the first cooling line and the heating line are connected to each other or blocked in connection by the first directional valve.

14. The heat management system of claim 1, wherein the second cooling line includes a first connection line branched from one side of the second cooling line and connected to the first cooling line; and a second connection line branched from the other side of the second cooling line and connected to the first cooling line.

15. The heat management system of claim 14, wherein the second cooling line and the first connection line are connected by a first directional valve, the second cooling line and the second connection line are connected by a second directional valve, and the first cooling line and the second cooling line is connected to each other or blocked in connection by the first directional valve and the second directional valve.

16. The heat management system of claim 1, wherein a drive motor of the electric component includes a front wheel drive motor and a rear wheel drive motor, and any one of a first electric component including the front wheel drive motor and a second electric component including the rear wheel drive motor is disposed on the first cooling line and the other is disposed on the second cooling line.

17. The heat management system of claim 16, wherein first cooling line includes:
a first connection line branched from one side of the first cooling line and connected to the heating line; and
a second connection line branched from the other side of the first cooling line and connected to the heating line, and the first electric component or the second electric component is disposed on the second connection line.

18. The heat management system of claim 1, wherein the second cooling line includes a first radiator for cooling the coolant with air.

19. The heat management system of claim 18, wherein the second cooling line further includes a first coolant pump for circulating the coolant.

20. The heat management system of claim 1, wherein the refrigerant circulation line further includes a third expansion valve throttling or bypassing the refrigerant discharged from the water-cooled condenser or blocking a flow of the refrigerant; and a chiller heat-exchanging the refrigerant discharged from the third expansion valve with coolant of the first cooling line.

21. The heat management system of claim 20, wherein the first cooling line includes a first connection line connected in parallel with the battery and passing through the chiller, and the first connection line is connected to the first cooling line by the first directional valve so that the coolant flows in the first connection line or a flow of the coolant is blocked by the first directional valve.

22. The heat management system of claim 20, wherein heating line includes a heater core heating an indoor area using air heated by heat-exchanging the coolant heat-exchanged with the refrigerant through the water-cooled condenser and air introduced to the indoor area; and the coolant heater disposed in front of the heater core in a flow direction of the coolant to heat the coolant.

23. The heat management system of claim 20, wherein, in a mild cooling mode, the third expansion valve is closed so that the refrigerant does not pass through the chiller.

\* \* \* \* \*